DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 8, 1972

901 O.G. 416

T901,020

METHOD OF FORMING PIGMENTED INKS AND COATINGS

Glenna E. Burnett, 1701 John B. Dennis Bypass, A–18 37462, and Charles H. Coney, 2008 Canterbury Road 37660, both of Kingsport, Tenn.

Filed Mar. 17, 1971, Ser. No. 125,328

Int. Cl. C09d *11/00*

U.S. Cl. 106—26

No Drawing. 17 Pages Specification

A method of forming pigmented inks and coatings by the use of wet pigment cake, cellulose propionate and a liquid which will dissolve, or in combination with water will dissolve the cellulose propionate, and will dissolve at least as much water as is contained in the wet pigment cake. The cellulose propionate is characterized by having from 0 to about 4.5% acetyl, a hydroxyl content of between about 4.4% and about 12%, a propionyl content of about 35% or more, and a viscosity of between about 0.02 second and about 20 seconds as measured by ASTM D–1343. The liquid is preferably an alcohol containing from 1 to 4 carbon atoms. The mixture preferably contains between about 2% and about 70% of pigment based on the weight of the cellulose propionate and between about 12.5% and about 40% water based on the weight of alcohol. The cellulose propionate is between about 5% and about 40% of the total weight of the solution. The necessity for drying the pigment is eliminated.